(12) United States Patent
Lam et al.

(10) Patent No.: US 7,418,695 B2
(45) Date of Patent: Aug. 26, 2008

(54) SYSTEM AND METHOD FOR PROVIDING INTEGRATED IMPACT ANALYSIS DATA

(75) Inventors: Kelvin Lam, Bedford, MA (US); Susan Cohan, Needham, MA (US); Melissa A. Borza, River Edge, NJ (US)

(73) Assignee: Computer Associates Think, Inc., Islandia, NY (US)

( * ) Notice: Subject to any disclaimer, the term of this patent is extended or adjusted under 35 U.S.C. 154(b) by 673 days.

(21) Appl. No.: 10/888,275

(22) Filed: Jul. 9, 2004

(65) Prior Publication Data

US 2005/0138151 A1 Jun. 23, 2005

Related U.S. Application Data

(60) Provisional application No. 60/487,063, filed on Jul. 11, 2003.

(51) Int. Cl.
*G06F 9/45* (2006.01)
(52) U.S. Cl. .................................. 717/102
(58) Field of Classification Search .......... 717/102; 713/100
See application file for complete search history.

(56) References Cited

U.S. PATENT DOCUMENTS

| | | | | |
|---|---|---|---|---|
| 5,812,849 A | * | 9/1998 | Nykiel et al. | 717/101 |
| 6,529,948 B1 | * | 3/2003 | Bowman-Amuah | 709/217 |
| 6,662,357 B1 | * | 12/2003 | Bowman-Amuah | 717/120 |
| 6,704,933 B1 | * | 3/2004 | Tanaka et al. | 725/132 |
| 2004/0177244 A1 | * | 9/2004 | Murphy et al. | 713/100 |
| 2006/0010425 A1 | * | 1/2006 | Willadsen et al. | 717/120 |

* cited by examiner

*Primary Examiner*—John Chavis
(74) *Attorney, Agent, or Firm*—Baker Botts L.L.P.

(57) ABSTRACT

Methods, systems, apparatus and computer-readable media are disclosed for providing cross-platform software dependency information. A first exemplary method is disclosed that includes receiving a request for software dependency information relating to a number of platforms. The method also includes identifying a set of applications, each application corresponding to a one of the set of platforms. The method further includes transmitting to each of the identified applications a platform-specific software dependency query. A response to each platform-specific software dependency query is received from each of the identified applications, and the are combined into a combined query result. The method still further includes transmitting the combined query result containing the software dependency information in response to the initial query. Other methods, apparatus, systems and computer readable media are disclosed for presenting cross-platform software dependency information.

18 Claims, 3 Drawing Sheets

SYSTEM AND METHOD FOR PROVIDING INTEGRATED IMPACT ANALYSIS DATA

CROSS REFERENCE TO RELATED APPLICATIONS

This application claims priority to and incorporates by reference the entirety of U.S. provisional application entitled "System and Method for Displaying Impact Analysis Data," Ser. No. 60/487,063, filed Jul. 11, 2003.

TECHNICAL FIELD

The described systems and methods are generally related to information processing environments in which software changes and configurations are managed. More specifically, the described systems and methods are related to displaying integrated impact analysis information derived from multiple sources.

BACKGROUND

Enterprises often employ large, complex, computing environments that include a number of enterprise components such as servers, routers, databases, repositories, mainframes, personal computers, business applications and enterprise management software, for example. Such enterprises may have a desire to track, evaluate and manage applications and software modules deployed throughout the enterprise.

Some of the applications and software modules deployed throughout an enterprise may be interrelated such that a proposed change to a particular module may impact one or more other interrelated modules. Such other interrelated modules may need to be reconfigured, updated, replaced or eliminated to correctly accommodate the proposed change to the particular module.

Impact analysis is a technique for evaluating what other software modules will change or will be impacted if a proposed change is made to a particular software module. Certain prior art impact analysis tools, which may be available as a part of change and configuration management ("CCM") applications, are available to assist in analyzing dependencies of software modules. Two such exemplary CCM applications are known as "AllFusion Endevor Change Manager" and "AllFusion Harvest Change Manager", each of which is developed, manufactured and marketed by Computer Associates ("CA"), the assignee of the present application.

These and other prior art impact analysis tools are designed to provide software module dependency information for software modules supported by a specific platform, such as Windows, UNIX or a mainframe platform, for example. Consequently, an enterprise supporting multiple platforms is presently unable to automatically obtain a comprehensive or integrated analysis of software dependencies across platforms. Presently, such a cross-platform impact analysis entails obtaining a separate dependency analysis for each platform and combining the analyses using one or more other software tools, such as a spreadsheet, database and report generation applications. The difficulties in assessing and analyzing the impact of proposed software changes is further complicated by the distributed nature of web-based software applications.

Consequently, there is a need for methods and systems that address the shortcomings of prior art impact analysis applications and provide an integrated display of impact analysis data from multiple CCM applications on different platforms. More specifically, there is a need for methods and systems to provide a web-based integrated display of impact analysis data derived from multiple data sources representing multiple CCM products running on different platforms.

SUMMARY

The following presents a simplified summary of methods, apparatus, systems, and computer readable media associated with graphically presenting integrated impact analysis information in accordance with the present application. This summary is not an extensive overview and is not intended to identify key or critical elements of the methods, apparatus, systems, and/or media or to delineate the scope of the methods, apparatus, systems, and media. It conceptually identifies the methods, apparatus, systems, and media in a simplified form as a prelude to the more detailed description that is presented later.

In accordance with one aspect of the present application, an exemplary method is disclosed for providing cross-platform software dependency information. The method includes receiving a request for software dependency information relating to a number of platforms. The method also includes identifying a set of applications, each application corresponding to a one of the set of platforms. The method further includes identification of which applications include software modules related to those initially identified. The method further includes transmitting to each of the identified applications a platform-specific specific software dependency query.

A response to each platform-specific software dependency query is received from each of the identified applications, and they are combined into a combined query result. The method still further includes transmitting the combined query result containing the software dependency information in response to the initial query.

In accordance with a second aspect of the present application, an exemplary apparatus is disclosed for presenting impact analysis information. The apparatus includes a processor and a memory in communication with the processor. The memory stores a program to control the operation of the processor. The processor is operative with the program in the memory to receive a request for software dependency information relating to a number of platforms. The processor is also operative with the program in the memory to identify a set of applications. Each application corresponds to a one of the plurality of platforms. The processor is further operative with the program in the memory to transmit to each of the applications a platform-specific software dependency query and to receive from each of the applications a platform-specific query response. The processor is still further operative with the program in the memory to combine the platform-specific query responses into a combined query result and to transmit the combined query result in response to the initial query.

In accordance with a third aspect of the present application, an exemplary computer-readable storage medium is disclosed. The medium is encoded with processing instructions for presenting CCM information.

Certain illustrative aspects of the methods, apparatus, systems and computer-readable media are described herein in connection with the following description and the annexed drawings. These aspects are indicative, however, of but a few of the various ways in which the principles of the methods, apparatus, systems, and media may be employed and thus the examples are intended to include such aspects and equivalents. Other advantages and novel features may become apparent from the following detailed description when considered in conjunction with the drawings.

BRIEF DESCRIPTION OF THE DRAWINGS

For a more complete understanding of the present methods and systems, reference is now made to the following description taken in conjunction with the accompanying drawings in which like reference numbers indicate like features and wherein.

DETAILED DESCRIPTION

Figure 1:
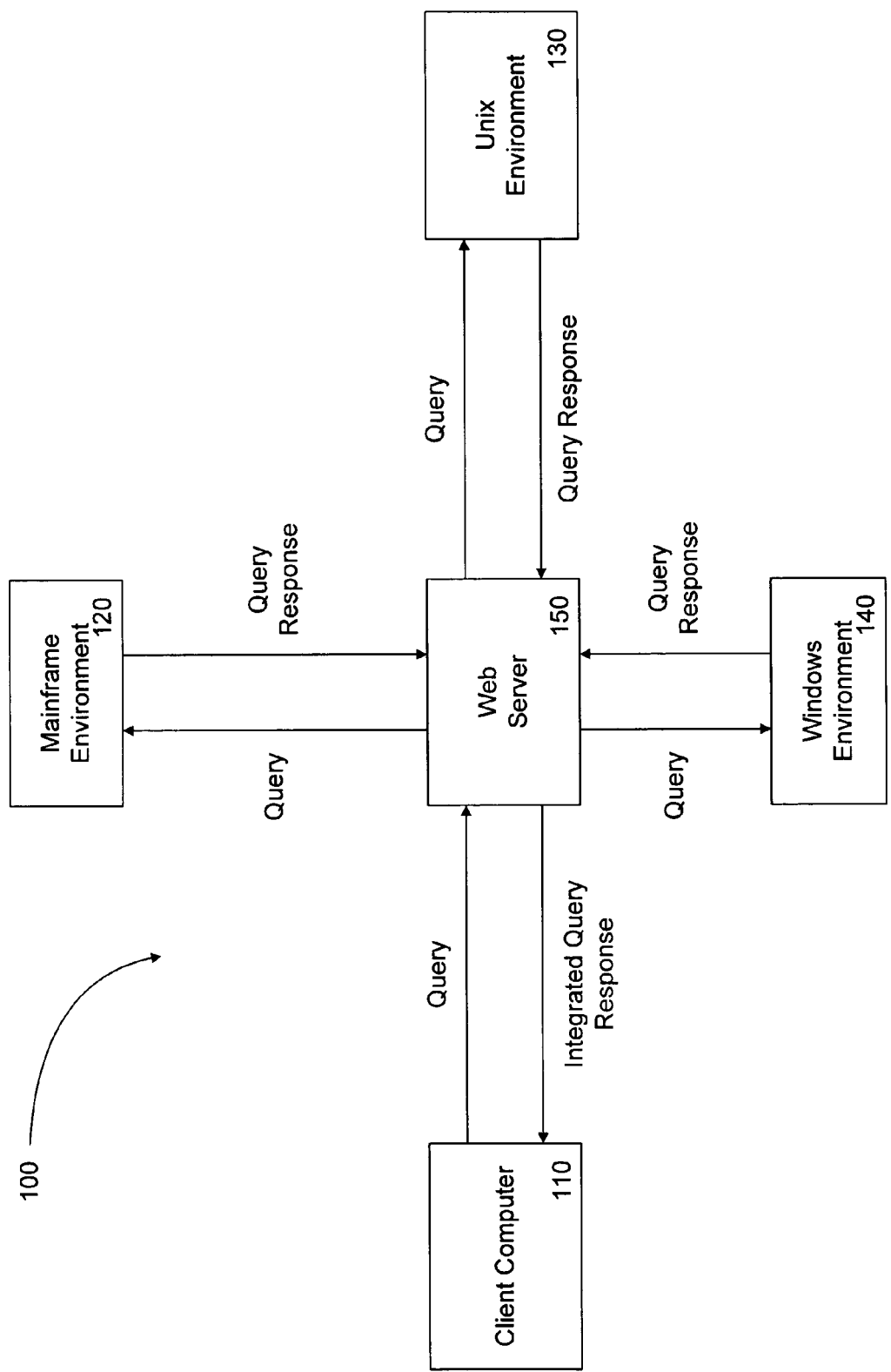
FIG. 1 is a block diagram illustrating an example enterprise information processing environment, in accordance with the systems and methods described in the present application.

Example methods and systems are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details. In other instances, well-known structures and devices are shown in block diagram form in order to simplify the description.

The present application relates to and incorporates by reference the entirety of two U.S. provisional patent applications entitled "System and Method for Visualization of Metadata," Ser. No. 60/487,061, and U.S. provisional patent application entitled "System and Method for Graphically Presenting Change and Configuration Management Information", Ser. No. 60/487,060, each filed Jul. 11, 2003. The present application also relates to and incorporates by reference the entirety of two concurrently filed U.S. non-provisional patent applications entitled "System and Method for Visualization of Mainframe Change Management Metadata" and "System and Method for Graphically Presenting Change and Configuration Management Information," each incorporated by reference in its entirety.

Referring to FIG. 1, a schematic block diagram illustrates an example enterprise information processing environment 100, and associated data flow within the example environment. The example enterprise environment 100 includes a client computer 110 that is in communication with a web server 150. Among the data that may be communicated between computer 110 and web server 150, computer 110 transmits to web server 150 a request for cross-platform impact analysis information, or software dependency information relating to a plurality of platforms. In response, after collecting the requested information from the plurality of specific platforms and combining the information, as described in greater detail below, web server 150 transmits an integrated query response back to computer 110.

The web server 150 is also in communication with a plurality of platform-specific environments. In the illustrated example, web server is in communication with mainframe environment 120, UNIX environment 130 and Windows environment 140. Of course, web server 150 may also be in communication with other platform-specific environments not illustrated in FIG. 1, such as Apple and Linux, for example. Upon receiving a user's request for cross-platform impact analysis information from computer 110, web server 150 transmits a platform-specific query to the first environment, identifies relationships between the software modules identified with the initial query, then transmits a platform-specific query to each identified other environment of 120, 130 and 140, to identify software dependency information related to the user's query. Each platform 120, 130 and 140, through a CCM application, responds to web server 150 by transmitting a query response.

According to the example enterprise environment 100, a user employs computer 110, to request for cross-platform impact analysis information using a single query. The present methods and systems allow CCM users and administrators to determine with a single query the impact of a code change, whether the impacted module resides on the mainframe or on a distributed platform. Although processing of the query is distributed among several components of the enterprise 100, a display of enterprise-wide, cross-platform impact analysis information is presented at a single point of control, namely computer 110.

As an example, the query could contain the name of a subject software module, the output from the process will be a web page that displays a list of all software modules in all CCM applications, across all platforms, that will be affected by a change in the subject software module. Further, selecting any affected software module on the web page will repeat the process and display a new web page that displays a list of all software modules in all CCM applications across all platforms, that will be affected by a change in the selected software module.

Figure 2:
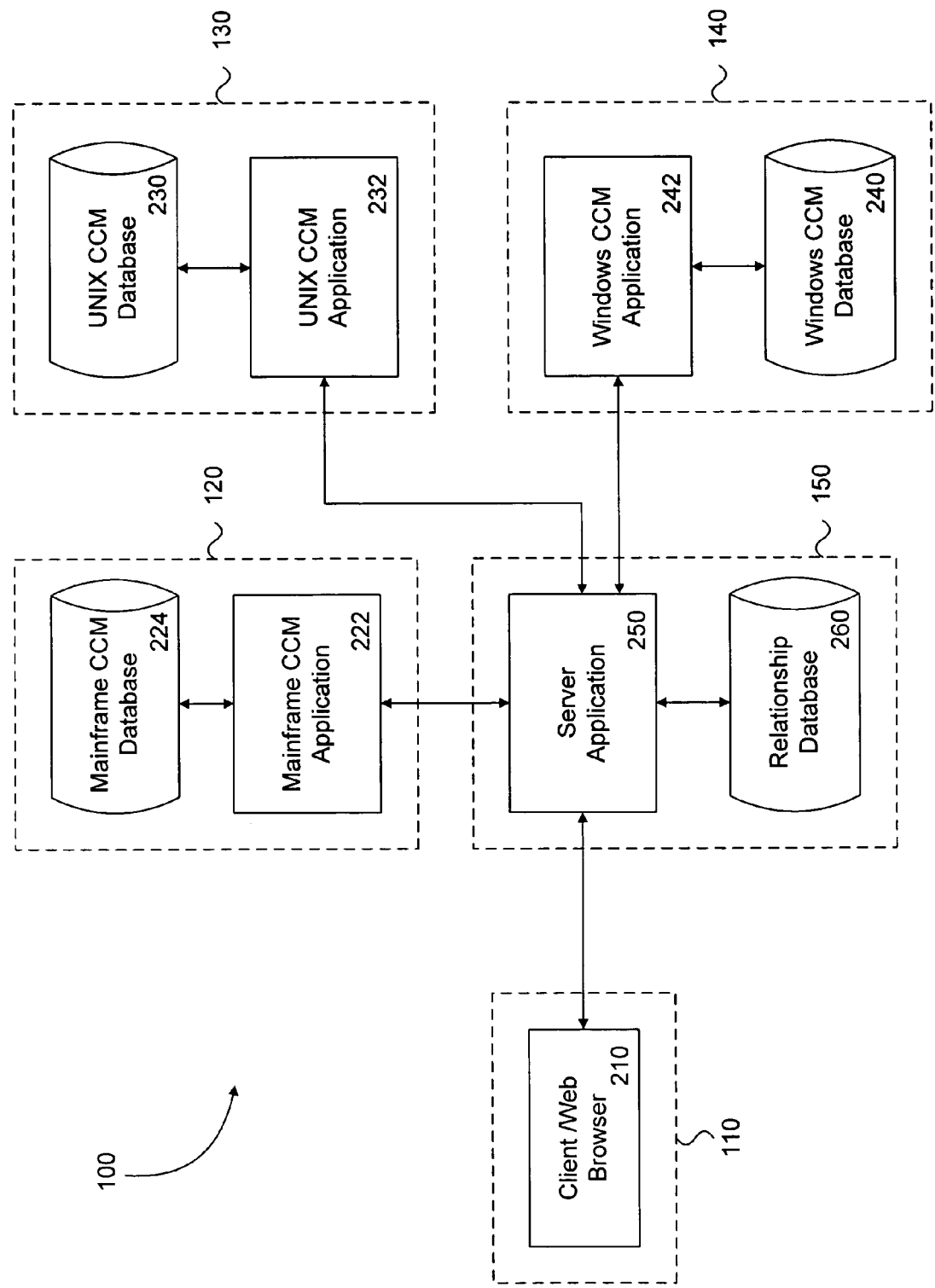
FIG. 2 is a block diagram illustrating a more detailed view of certain components of the example enterprise information processing environment of FIG. 1.

Referring now to FIG. 2, a schematic block diagram illustrates in more detail the example enterprise environment 100 illustrated in FIG. 1. Specifically, client computer 110 includes a web browser application 210. Web browser 210 of computer 110 communicates with server application 250 of web server 150. Specifically, web browser 210 transmits a query for enterprise-wide, cross-platform impact analysis information to web server 150. The query is processed by server application 250 which provides an integrated, centralized point of control for change and configuration management activities.

Server application 250 services the request, in part, by identifying a plurality of platform-specific CCM applications, where each application corresponds to a different platform within the enterprise. The dependency relationships between the objects are maintained in the relationship database 260 by the server application 250. Server application 250 queries each platform-specific CCM application based on the relationships maintained in the database 260 to determine the software dependency information for each corresponding platform. As shown, a mainframe CCM application 222 and a mainframe CCM database 224 service platform-specific requests submitted for mainframe environment 120. A UNIX CCM application 232 and a UNIX CCM database 230 service platform-specific requests submitted for UNIX environment 130, and a Windows CCM application 242 and a Windows CCM database 240 service platform-specific requests submitted for Windows environment 140.

Server application 250 further creates a combined query result based on the results received from the platform-specific CCM applications, and provides the combined query result back to web browser 210. In one embodiment, server application 250 has the ability to collect and combine data from several data sources, including relational databases, multi-dimensional data sources, or flat files, for example, and present the combined data in a single location. In one example embodiment, the combined query response is provided in HTTP format for display by web browser 210, for example.

In the example embodiment, the server application 250 is a thin-client web-based application that uses Java Server Pages ("JSP") and Java technologies on the web server to generate dynamic HTML web pages, such as AllFusion CM Enterprise Workbench, provided by Computer Associates, for example.

Server application 250 processes the query and provides a query to accessible platform-specific CCM applications 222, such as CA's AllFusion Endevor CCM on mainframe 120. The platform-specific CCM application 222 responds with a query result including impact analysis data relating to the software supported by the platform. The server application 250 combines the received platform-specific query results with other query results from other platform-specific CCM applications and provides the processed query result to client web browser 210 for presentation to the user. In one embodiment, the combined query results may be presented to the user via a web page that is created using JSP.

In order to access the CCM information from the AllFusion Endevor CM on Mainframe 120, Java programs on the AllFusion CM Enterprise Workbench server 250 make a call to the Endevor API on the Mainframe and download the resulting CCM information from AllFusion Endevor CM 222 on the mainframe to the workstation. In one embodiment, the combined query results may be presented to the user via a web page that is created using JSP Similarly, the AllFusion CM Enterprise Workbench server 250 accesses the CCM information from the AllFusion Harvest CM on UNIX 230 and Windows 240. The UNIX and Windows CCM applications 230 and 240, respectively, makes the appropriate database call(s) the appropriate data base, such as AllFusion CM Harvest database 230 and/or AllFusion CM Harvest database 240. Upon receiving all of the requested information from each of the platform-specific CCM applications, the resulting information is combined and transmitted to web browser 210 for presentation to the user graphically via a web page that is created using JSP.

Figure 3:
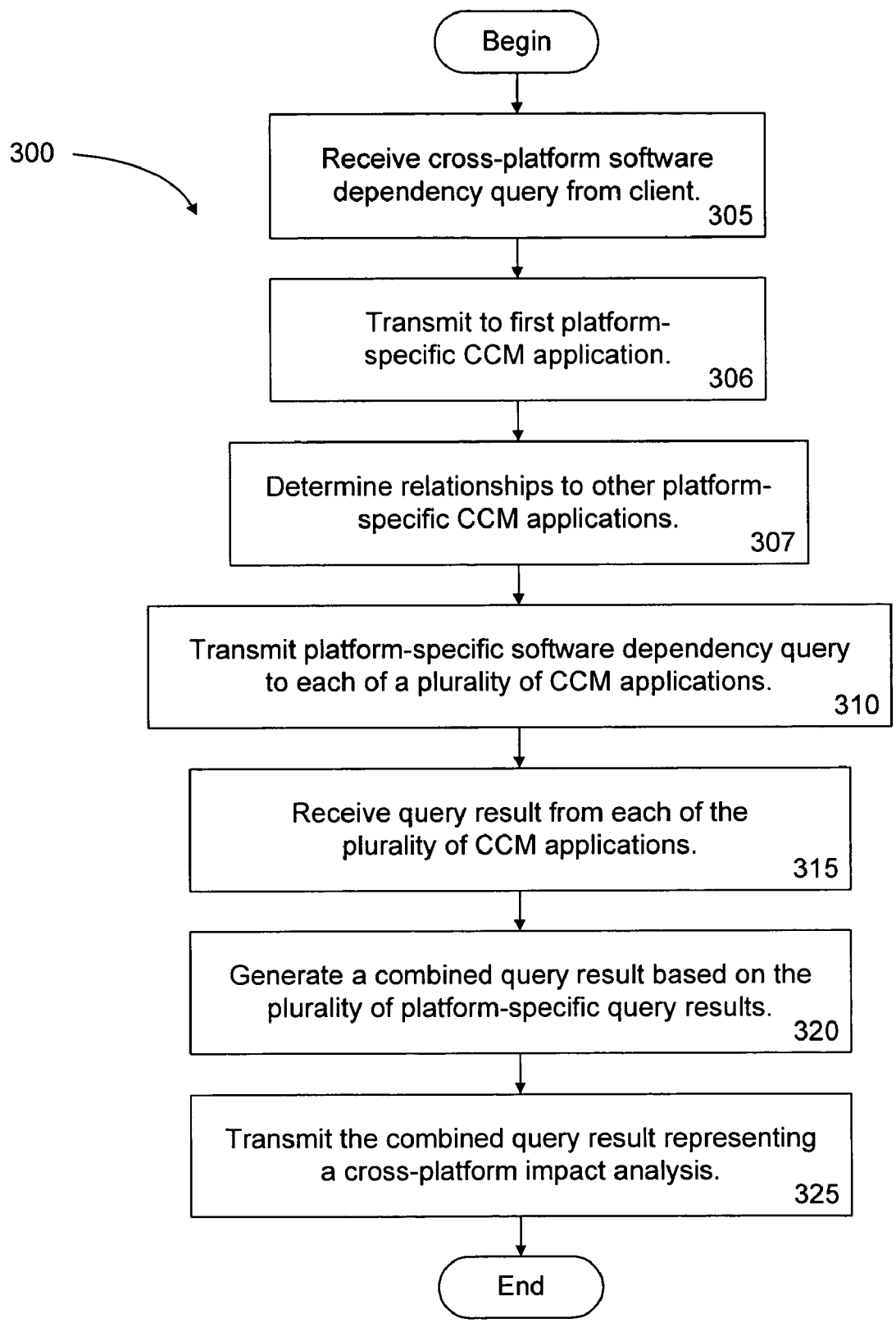
FIG. 3 is an example methodology for providing integrated software dependency information.

FIG. 3 is a flowchart illustrating an example method 300 for presenting cross-platform software dependency information. At block 305, a request for cross-platform software dependency information is received by a server application, such as server application 250, for example. In the example embodiment, the client provides the query via a web browser, although other means for providing the query are know by those of ordinary skill in the art and are considered within the scope of the present application. The query may be transmitted directly between the client and the application or may be routed via an network, such as the internet, an intranet or an extranet.

A platform-specific software dependency query request is sent to first platform-specific CCM application at block 306. A determination is made whether the object represented by the query request is related to objects in other CCM platform applications at block 307.

A platform-specific software dependency query request is sent to each of a plurality of platform-specific CCM applications at block 310. At block 315, platform-specific query results are received from the plurality of CCM applications. The platform-specific query results are combined at block 320 to create a combined query result representing the requested cross-platform software dependency information. At block 325, the combined query result is transmitted to the requesting computer. The combined query results may be displayed by the requesting computer or used as the basis for other information processing activities.

What has been described above includes several examples. It is, of course, not possible to describe every conceivable combination of components or methodologies for purposes of describing the systems, apparatus, methods, and computer readable media associated with providing integrated impact analysis data. However, one of ordinary skill in the art may recognize that further combinations and permutations are possible. Accordingly, this application is intended to embrace such alterations, modifications, and variations that fall within the scope of the appended claims. Furthermore, to the extent that the term "includes" is employed in the detailed description or the claims, such term is intended to be inclusive in a manner similar to the term "comprising" as that term is interpreted when employed as a transitional word in a claim.

What is claimed is:

1. A method for providing cross-platform dependency information, comprising:
   receiving a request for software dependency information for a particular software module relating to a plurality of platforms, the request indicating a proposed change of the particular software module;
   identifying a plurality of change and configuration management ("CCM") applications, each CCM application corresponding to a one of the plurality of platforms;
   identifying a subset of the plurality of CCM applications which include information related to the request for software dependency information;
   transmitting to each of the subset of CCM applications a platform-specific specific software dependency query;
   receiving from each of the subset of CCM applications a platform-specific query response;
   combining the platform-specific query responses into a combined query result, the combined query result indicating one or more software modules impacted by the proposed change of the particular software module; and
   transmitting the combined query result containing the software dependency information relating to the plurality of platforms.

2. The method of claim 1, wherein the step of transmitting the combined query result includes transmitting an HTML document including the combined query result.

3. The method of claim 1, the step of identifying includes identifying a CCM application corresponding to a Unix platform.

4. The method of claim 1, the step of identifying includes identifying a CCM application corresponding to a Windows platform.

5. The method of claim 1, the step of identifying includes identifying a CCM application corresponding to a Apple platform.

6. The method of claim 1, wherein the step of identifying includes identifying a CCM application corresponding to a mainframe computer.

7. An apparatus for presenting change and configuration management ("CCM") information, comprising:
   a processor;
   a memory connected to said processor storing a program to control the operation of said processor;
   the processor operative with the program in the memory to:
      receive a request for software dependency information for a particular software module relating to a plurality of platforms, the request indicating a proposed change of the particular software module;
      identify a plurality of CCM applications, each CCM application corresponding to a one of the plurality of platforms;
      identify a subset of the plurality of CCM applications which include information related to the request for software dependency information;
      transmit to each of the subset of CCM applications a platform-specific specific software dependency query;

receive from each of the subset of CCM applications a platform-specific query response;

combine the platform-specific query responses into a combined query result, the combined query result indicating one or more software modules impacted by the proposed change of the particular software module; and transmit the combined query result containing the software dependency information relating to the plurality of platforms.

8. The apparatus of claim 7, wherein the processor is further operative with the program in the memory to transmit an HTML document including the combined query result.

9. The apparatus of claim 7, wherein the processor is further operative with the program in the memory to identify a CCM application corresponding to a Unix platform.

10. The apparatus of claim 7, wherein the processor is further operative with the program in the memory to identify a CCM application corresponding to a Windows platform.

11. The apparatus of claim 7, wherein the processor is further operative with the program in the memory to identify a CCM application corresponding to a Apple platform.

12. The apparatus of claim 7, wherein the processor is further operative with the program in the memory to identify a CCM application corresponding to a mainframe computer.

13. A computer-readable storage medium encoded with processing instructions for presenting change and configuration management ("CCM") information, the processing instructions for directing a computer to perform the steps of:

receiving a request for software dependency information for a particular software module relating to a plurality of platforms, the request indicating a proposed change of the particular software module;

identifying a plurality of CCM applications, each CCM application corresponding to a one of the plurality of platforms;

identifying a subset of the plurality of CCM applications which include information related to the request for software dependency information;

transmitting to each of the subset of CCM applications a platform-specific specific software dependency query;

receiving from each of the subset of CCM applications a platform-specific query response;

combining the platform-specific query responses into a combined query result, the combined query result indicating one or more software modules impacted by the proposed change of the particular software module; and transmitting the combined query result containing the software dependency information relating to the plurality of platforms.

14. The computer-readable storage medium of claim 13, wherein the step of transmitting the combined query result includes transmitting an HTML document including the combined query result.

15. The computer-readable storage medium of claim 13, wherein the step of identifying includes identifying a CCM application corresponding to a Unix platform.

16. The computer-readable storage medium of claim 13, wherein the step of identifying includes identifying a CCM application corresponding to a Windows platform.

17. The computer-readable storage medium of claim 13, wherein the step of identifying includes identifying a CCM application corresponding to a Apple platform.

18. The computer-readable storage medium of claim 13, wherein the step of identifying includes identifying a CCM application corresponding to a mainframe computer.

* * * * *